United States Patent [19]
Callicutt et al.

[11] Patent Number: 5,632,184
[45] Date of Patent: May 27, 1997

[54] SAFETY PEDAL FOR MOTOR VEHICLES

[76] Inventors: Allen Callicutt, 2686 N.C. Highway 134; James Ridge, 1115 E. River Run, both of Asheboro, N.C. 27203

[21] Appl. No.: 550,408

[22] Filed: Oct. 30, 1995

[51] Int. Cl.$^6$ ........................................... G05G 1/14
[52] U.S. Cl. .................. 74/512; 74/470; 464/169; 403/220
[58] Field of Search ..................... 74/512, 560, 561, 74/470; 464/161, 169; 267/153; 403/223, 224, 220, 291

[56] References Cited

U.S. PATENT DOCUMENTS

| | | |
|---|---|---|
| 3,353,423 | 11/1967 | Lehmann .................. 74/526 |
| 3,931,746 | 1/1976 | Hansen ..................... 74/512 |
| 4,043,217 | 8/1977 | Kleist ....................... 74/470 |
| 4,258,931 | 3/1981 | Lee et al. . |
| 4,621,538 | 11/1986 | Senft et al. ............. 74/512 X |
| 4,726,438 | 2/1988 | Stuertz et al. . |
| 5,195,606 | 3/1993 | Martyniuk . |
| 5,531,135 | 7/1996 | Dolla ....................... 74/512 |

OTHER PUBLICATIONS

SAE Technical Paper Series entitled Mechanisms of Fracture in Ankle and Foot Injuries to Drivers in Motor Vehicle Crashes; 36th Stapp Car Crash Conference Seattle, Washington, Nov. 2–4, 1992.

*Primary Examiner*—Andrea L. Pitts
*Assistant Examiner*—Saul Rodriguez
*Attorney, Agent, or Firm*—Rhodes Coates & Bennett, L.L.P.

[57] ABSTRACT

A vehicle safety pedal apparatus includes a foot engaging portion, a linkage attachment for attaching the pedal apparatus to a vehicle, a pedal linkage coupled between the linkage attachment and the foot engaging portion including first and second sub-linkages and a shock absorber coupled between the first and second sub-linkages to absorb shock during a collision of a person's lower extremity with the pedal apparatus during a motor vehicle accident, the shock absorber including a sleeve on the first sub-linkage forming a cavity, and a pin, the sleeve further including through aligned apertures and the second sub-linkage further including an elongated aperture, the apertures of the sleeve aligned with the elongated aperture, and the pin extending through the aligned apertures, thereby providing limited slidable engagement of the sub-linkages, the cavity containing a resilient shock absorbing material that is capable of restoring its shock absorbing capacity after absorbing an initial shock.

18 Claims, 2 Drawing Sheets

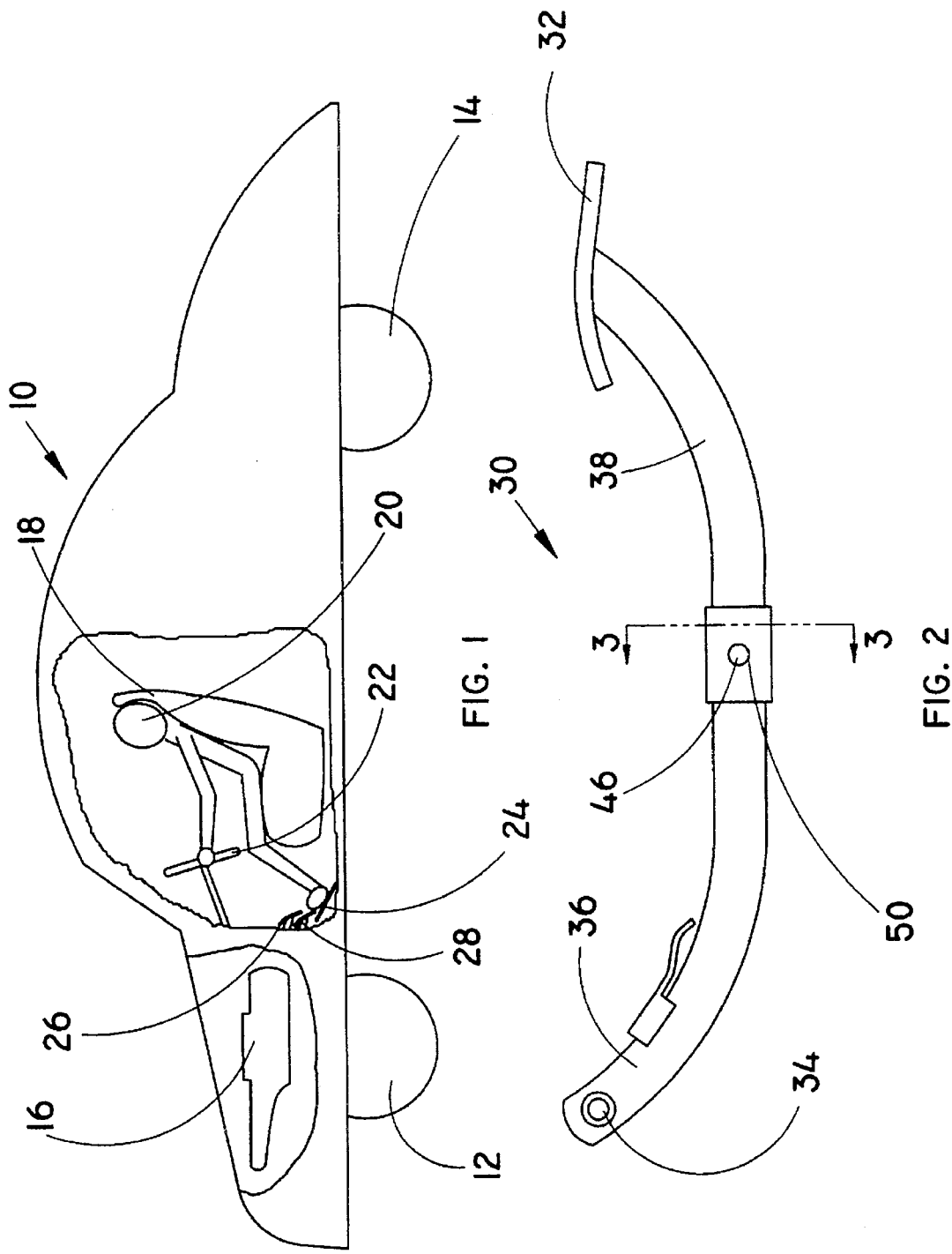

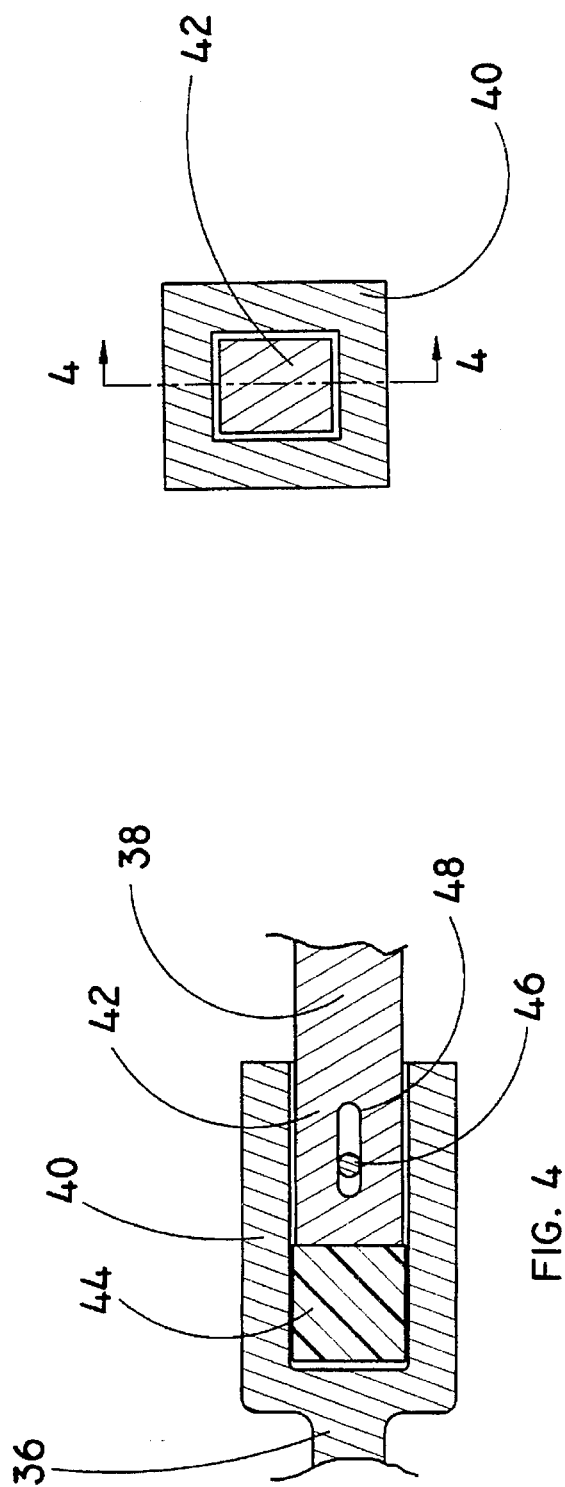
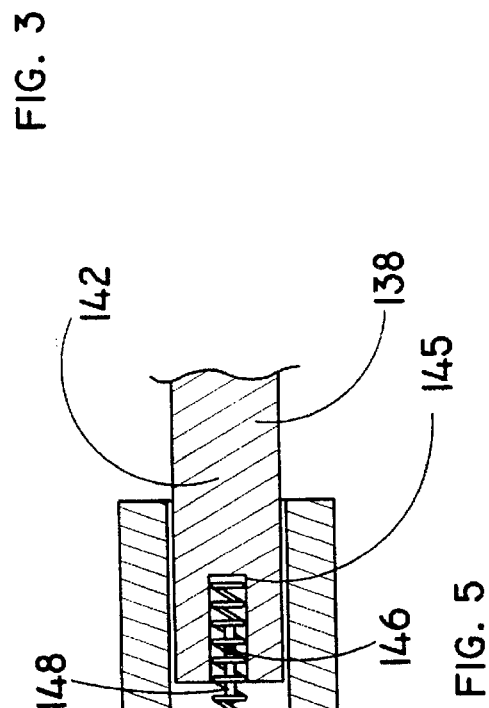
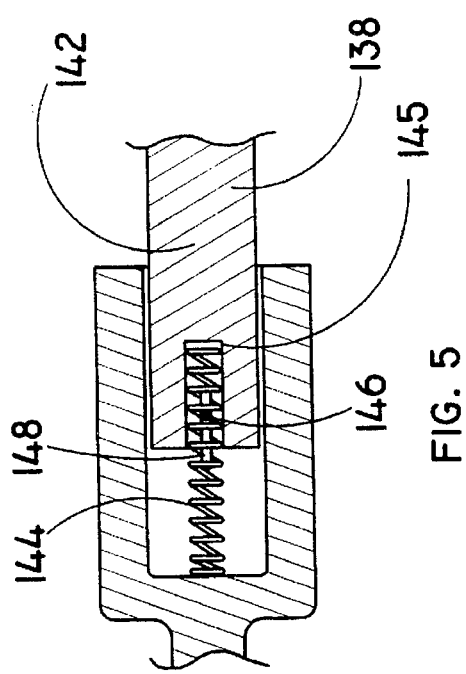

SAFETY PEDAL FOR MOTOR VEHICLES

BACKGROUND OF THE INVENTION

The present invention relates to an improved pedal for a vehicle to reduce injuries to the lower extremity of a driver of the vehicle in the event of a vehicle crash, and the use of such a pedal.

Injuries to the feet, ankles or legs of a driver of a motor vehicle involved in a crash or collision are, unfortunately, commonplace. A frequent occurrence in such collisions is the impact of the lower extremity of the driver with the clutch or brake pedal of the vehicle with sufficient force that severe fractures of the bones of the feet, ankles or legs of the driver result, as well as soft tissue damage. These injuries are very difficult to heal, resulting in high costs for lengthy convalescences.

The prevalence of this problem was documented in "Mechanisms of Fracture in Ankle and Foot Injuries to drivers in Motor Vehicles Crashes," D. C. Lestina et al., 36th Stapp Car Crash Conference Proceedings (P-261), presented at the Stapp Car Crash Conference in Seattle, Washington, Nov. 2–4, 1992. That paper indicates that impact with foot pedals accounts for 36% of studied injuries. Such impact was the single largest cause of fracture injuries to the foot in that study. The article concludes by saying that "improved vehicle designs could reduce the likelihood of such injuries in crashes," but gives no specifics as to what could be changed or how.

An article headlined "Insurers find some accident costs actually increase" in the newspaper USA Today, page 4B as recently as Sep. 29, 1995 shows that serious injuries to legs, ankles and feet continue to be a serious problem. Thus there is a well-documented need for some means to reduce the severity of injuries to driver's lower extremities arising from motor vehicle crashes.

SUMMARY OF THE INVENTION

The present invention fulfills this need in the art by providing a pedal for a motor vehicle to reduce injury to a motor vehicle occupant's lower extremity in the event of a motor vehicle collision including a foot engaging portion and a linkage having a rigidity sufficient to transmit forces exerted on the linkage by an occupant pressing on the foot engaging portion during normal motor vehicle operation and a contractible portion with a rigidity such that the contractible portion collapses to a shortened condition when the foot engaging portion impacts a motor vehicle occupant's lower extremity in a motor vehicle accident and thus absorbs much of the force of such impact and reduces the force absorbed by the occupant's lower extremity.

The linkage may include two shaft portions and the contractible portion may be made up of mating male and female ends on opposed ones of the two shaft portions with a compressible material received in the female end, whereby the male end penetrates the female end to compress the compressible material when the occupant's lower extremity impacts the foot engaging portion.

The invention also provides a motor vehicle for traversing a path including a body configured to house a driver, an engine for propelling the vehicle, and vehicle controls for controlling the vehicle including a pedal to be actuated by the driver, with the pedal as described above.

The invention also provides a vehicle safety pedal apparatus including a foot engaging portion, a linkage attachment for attaching the pedal apparatus to a vehicle, and a pedal linkage coupled between the linkage attachment and the foot engaging portion including a shock absorber to absorb shock during a collision of a person's lower extremity with the pedal apparatus during a motor vehicle accident.

The shock absorber is preferably resiliently compressible, thereby allowing the pedal apparatus to return to an original configuration after compression.

Typically, the safety pedal is used in an automobile, such as for a brake pedal or a clutch pedal.

The pedal linkage may include first and second sub-linkages, with the shock absorber coupled between the sub-linkages. The shock absorber may provide for the first sub-linkage to slidably engage the second sub-linkage. The shock absorber may include a sleeve on the first sub-linkage configured to slidably engage the second sub-linkage. In this embodiment, the first sub-linkage sleeve typically forms a cavity containing a shock absorbing material. Preferably, the shock absorbing material is resilient, so that it is capable of restoring its shock absorbing capacity after absorbing an initial shock.

The shock absorber may also include a pin, with the sleeve having through-aligned apertures and the second sub-linkage having an elongated aperture. The apertures of the sleeve are aligned with the elongated aperture, and the pin extends through the aligned apertures, thereby providing limited slidable engagement of the sub-linkages.

The invention also provides a method of reducing injury to a lower extremity of a motor vehicle driver in a motor vehicle accident. The method includes controlling the vehicle such as by actuating a pedal by the driver, the pedal configured to a have a foot engaging portion and a linkage having sufficient rigidity to transmit forces exerted on the linkage by the driver pressing on the foot engaging portion during normal motor vehicle operation and a contractible portion. The method includes collapsing the contractible portion to a shortened condition when the foot engaging portion impacts the driver's lower extremity in a motor vehicle accident, thus absorbing much of the force of such impact and reducing the force absorbed by the driver's lower extremity.

The method may include restoring the contractible portion to an uncontracted condition by a restorative resilience so as to be ready for a subsequent contracting step.

BRIEF DESCRIPTION OF THE DRAWINGS

The invention will be better understood after a reading of the Detailed Description of the Preferred Embodiments and a review of the drawings in which:

FIG. 1 is a side elevational view of a motor vehicle equipped according to an embodiment of our invention;

FIG. 2 is an enlarged view of a clutch pedal or brake pedal according to a preferred embodiment of our invention;

FIG. 3 is a sectional view taken along lines 3—3 in FIG. 2 looking in the direction of the arrows;

FIG. 4 is a sectional view taken along lines 4—4 in FIG. 3 looking in the direction of the arrows; and FIG. 5 is a sectional view like the view of FIG. 4 of an alternate embodiment.

DETAILED DESCRIPTION OF THE PREFERRED EMBODIMENTS

The invention provides an improved motor vehicle 10 such as an automobile, truck, bus or the like. As is typical of such motor vehicles, they are provided with front wheels 12, rear wheels 14, and an engine 16 to provide for locomotion of the motor vehicle 10 over the roadway. The motor vehicle 10 also includes a driver's seat on which a driver 20 can sit and manipulate a steering wheel 22. The driver has also accessible to him or her an accelerator pedal 24 and a brake pedal 26. For vehicles provided with clutches, a clutch pedal 28 is also accessible to the driver for normal actuation during operation of the motor vehicle 10. The foregoing is, of course, conventional.

In prior art motor vehicles, serious injuries to the driver can occur. In the event of a collision or other crash of the motor vehicle, the driver is thrown about in the area of the front seat of the vehicle and of particular concern are the collisions of the driver's lower extremities with the clutch and brake pedals. The force of the collision of the vehicle can be so great as to provide for uncontrolled impact between the foot, ankle, leg or other portion of the lower extremity of the driver with either of the pedals and cause severe injury to the lower extremity. This occurs even in the circumstance of the driver wearing a seatbelt or being held in place in the seat by an airbag. The lower extremities are simply free to flail about in the passenger cabin and cause the injuries.

However, as seen in the enlarged figures of the pedals 26 and 28 shown in FIGS. 2–4, an improved pedal according to the invention can be designed to absorb the force of the impact, rather than having that force be absorbed by the lower extremity of the driver and cause injury.

An embodiment of the safety pedal 30 is seen in FIG. 2, greatly enlarged from the view of FIG. 1. The safety pedal 30 includes a foot-engaging portion 32, a linkage attachment 34 to attach to the operative motor vehicle components, such as a conventional brake or clutch linkage. The foot-engaging portion 32 and linkage attachment 34 can be of any conventional or other preferred design. As can be seen in FIGS. 1 and 2, the linkage is oriented so as to enable it to dissipate forces occurring during a crash without significantly affecting the pedal's normal operation before such crash. The pedal 30 includes a first sub-linkage 36 and a second sub-linkage 38, shown in FIG. 2. The first sub-linkage 36 is provided with a sleeve or female end 40, seen better in FIG. 4. The female end 40 has within it a resilient shock absorber material 44. The second sub-linkage 38 is provided with a male end 42 sized to be received within the female end 40 on the first sub-linkage 36. The sleeve 40 also has two opposed apertures 50 on either side which can be aligned with elongated aperture 48 on the male end of the second sub-linkage by locating the male end of the second sub-linkage 38 within the female end 40 of the first sub-linkage 36. A pin 46 is then inserted through the two opposed apertures 50, securing the male end 42 within the female end 40. The location of the male end 42 within the female end 40 is shown in FIG. 3.

In operation, the safety pedal 30 can be used in conventional fashion with the driver applying force to the foot-engaging portion 32 to transmit that force through the first and second sub-linkages to the linkage attachment 34 and achieve the desired actuation. The location of the male end 42 within the female end 40 is held in position by the pin 46. The resilient shock absorber 44 provides for secure transmission of forces from the male end of the foot-engaging portion 32 through the sub-linkage 36 to the attachment 34. In addition, since the force applied to the foot-engaging portion 32 is transverse to the elongation of the elongated aperture 48, the force acting to compress the resilient shock absorber 44 during normal operation is not great.

However, in the event of a collision or other crash of the vehicle 10, the driver's lower extremity may collide with the pedal 30, most likely contacting the foot-engaging portion 32. The direction of such motion is likely to be parallel or have a substantial component parallel with the elongation of the elongated aperture 48. The colliding extremity will exert a force acting to compress the resilient shock absorber 44. The force is used to compress the shock absorber 44 and is dissipated in that fashion. This reduces the force which is likely to be absorbed by the lower extremity of the driver 20 in the collision. This reduced force results in a reduced likelihood and reduced severity of any injurious results to the lower extremity of the driver 20.

Preferably, the shock absorbing material 44 is made to be resilient, so that immediately after compression, it restores itself to its normal configuration. This is an important feature of a preferred embodiment because it may come to pass that, in a collision, the lower extremity impacts against the pedal more than once, so there are numerous shocks to be absorbed. This is particularly likely to occur in the event that the vehicle 10 rolls over several times. The continuing change in the angle of the force of gravity may cause the driver's lower extremities to impact the pedal repeatedly. If the safety pedal is restored to its shock absorbing capacity immediately after each impact, it will absorb the repeated shocks without causing severe injuries to lower extremities of the driver.

The resilient shock absorbing material 44 can be any desired composition, preferably a resilient foam material having a compressibility selected to absorb the forces likely to occur in a collision but yet withstand the type of forces normally encountered during the normal operation of the pedal 30. In a preferred embodiment as seen in FIG. 5, the shock absorber is a spring 144 selected to have a spring constant meeting these criteria. The spring may be lodged in a seat 145 in the male end 142 of the sub-linkage 138. Also, the elongated aperture 48 need not be in the male member, but could be in the female member in place of the opposed holes 50, as at 148. In such a configuration, a crosswise extending pin 146 in the female member holds the male member on the female member by also extending through the opposed elongated apertures 148 in the female member. The pin may also pass through the seat in the male member to hold the spring 144 in place.

Those of ordinary skill in the art will appreciate that the invention can be carried out in various configuration other than the specific embodiment disclosed herein. Those configurations and modifications to the specific designs disclosed herein are deemed to be within the scope of this invention.

What is claimed is:

1. A pedal for a motor vehicle to reduce injury to a motor vehicle occupant's lower extremity in the event of a motor vehicle collision comprising a foot engaging portion, first and second shaft portions, and a linkage connecting said shaft portions and spaced from said foot engaging portion having a rigidity sufficient to transmit forces exerted on said linkage by an occupant pressing on said foot engaging shaft portion during normal operation and a contractible portion with a rigidity such that said contractible portion contracts to a shortened condition when said foot engaging shaft portion impacts a motor vehicle occupant's lower extremity in a motor vehicle accident and thus absorbs much of the force of such impact and reduces the force absorbed by the occupant's lower extremity.

2. An apparatus as claimed in claim 1 wherein said contractible portion comprises mating male and female ends on opposed ones of said two shaft portions with a compressible material received in said female end, whereby said male end penetrates said female end to compress said compressible material when the occupant's lower extremity impacts said foot engaging portion.

3. A motor vehicle for traversing a path comprising
   a body configured to house a driver, an engine for propelling the vehicle, and vehicle controls for controlling the vehicle including a pedal to be actuated by the driver, said pedal comprising
   a foot engaging portion,
   first and second shaft portions, and
   a linkage connecting said shaft portions and spaced from said foot engaging portion having
      a rigidity sufficient to transmit forces exerted on said linkage by an occupant pressing on said foot engaging shaft portion during normal vehicle operation and
      a contractible portion with a rigidity such that said contractible portion compresses to a shortened condition when said foot engaging shaft portion impacts a motor vehicle occupant's lower extremity in a motor vehicle accident and thus absorbs much of the force of such impact and reduces the force absorbed by the occupant's lower extremity.

4. A vehicle safety pedal apparatus comprising:
   a foot engaging portion;
   a linkage attachment for attaching the pedal apparatus to a vehicle so that said foot engaging portion operates in a normal-use direction; and
   a pedal linkage coupled between said linkage attachment and said foot engaging portion including a shock absorber to absorb shock transverse to said normal use direction during a collision of a person's lower extremity with the pedal apparatus during a motor vehicle accident.

5. A vehicle stably pedal as claimed in claim 4 wherein said shock absorber is resiliently compressible, thereby allowing the pedal apparatus to return to an original position after compression.

6. A vehicle safety pedal as claimed in claim 4 wherein said safety pedal is used in an automobile.

7. A vehicle safety pedal as claimed in claim 4 wherein said safety pedal is a brake pedal.

8. A vehicle safety pedal as claimed in claim 4 wherein said safety pedal is a clutch pedal.

9. A vehicle safety pedal as claimed in claim 4 wherein said shock absorber includes a spring.

10. A vehicle safety pedal as claimed in claim 4 wherein said pedal linkage further includes a first and second sub-linkages, and said shock absorber is coupled between said sub-linkages.

11. A vehicle safety pedal as claimed in claim 10 wherein said shock absorber provides for said first sub-linkage to slidably engage said second sub-linkage.

12. A vehicle safety pedal as claimed in claim 11 wherein said shock absorber includes a sleeve on said first sub-linkage configured to slidably engage said second sub-linkage.

13. A vehicle safety pedal as claimed in claim 12 wherein said first sub-linkage sleeve forms a cavity, said cavity containing a shock absorbing material.

14. A vehicle safety pedal as claimed in claim 13 wherein said shock absorbing material is resilient, so that it is capable of restoring its shock absorbing capacity after absorbing an initial shock.

15. A vehicle safety pedal as claimed in claim 12 further comprising a pin, wherein said sleeve further includes through-aligned apertures and second sub-linkage further including an elongated aperture, said apertures of said sleeve aligned with said elongated aperture, and said pin extending through said aligned apertures, thereby providing limited slidable engagement of said sub-linkages.

16. A vehicle safety pedal apparatus comprising:
    a foot engaging portion;
    a linkage attachment for attaching the pedal apparatus to a vehicle;
    a pedal linkage coupled between said linkage attachment and said foot engaging portion including first and second sub-linkages and a shock absorber coupled between said first and second sub-linkages to absorb shock during a collision of a person's lower extremity with the pedal apparatus during a motor vehicle accident, said shock absorber including a sleeve on said first sub-linkage forming a cavity, and a pin, said sleeve further including through aligned apertures and said second sub-linkage further including an elongated aperture, said apertures of said sleeve aligned with said elongated aperture, and said pin extending through said aligned apertures, thereby providing limited slidable engagement of said sub-linkages, said cavity containing a resilient shock absorbing material that is capable of restoring its shock absorbing capacity after absorbing an initial shock.

17. A method of reducing injury to a lower extremity of a motor vehicle driver in a motor vehicle accident comprising
    controlling the vehicle including actuating a pedal by the driver in a normal-use direction, the pedal configured to have a foot engaging portion and a linkage having sufficient rigidity to transmit threes exerted on the linkage by the driver pressing on the foot engaging portion during normal motor vehicle operation and a contractible portion, and
    contracting the contractible portion to a shortened condition in a direction transverse to the normal use direction when the foot engaging portion impacts the driver's lower extremity in a motor vehicle accident, thus absorbing much of the force of such impact and reducing the force absorbed by the driver's lower extremity.

18. A method as claimed in claim 17 further comprising restoring the contractible portion to an uncontracted condition by a restorative resilience so as to be ready for a subsequent impacting step.

* * * * *